Sept. 19, 1961 K. PRINS ET AL 3,000,026
MACHINE FOR BRUSHING PIPE FITTINGS
Filed June 13, 1958 3 Sheets-Sheet 1

INVENTORS
KLAAS PRINS
ARTHUR J. STOCKMEISTER
BY
CORBETT, MAHONEY, MILLER & RAMBO, ATTY'S.

United States Patent Office 3,000,026
Patented Sept. 19, 1961

3,000,026
MACHINE FOR BRUSHING PIPE FITTINGS
Klaas Prins, 104 East D St., Wellston, Ohio, and Arthur J. Stockmeister, 227 Main St., Jackson, Ohio
Filed June 13, 1958, Ser. No. 741,947
8 Claims. (Cl. 15—21)

Our invention relates to a machine for brushing pipe fittings. By the term "pipe fittings," we intend to cover all types of pipe or conduit fittings and not only the fittings themselves, but the ends of the pipe or conduit which fit therein.

The invention has to do, more particularly, with a machine for wire brushing the mating surfaces of pipe or conduit fittings so that cooperating fittings can be fitted and secured together in a fluid-tight relationship by soldering or other means.

As is well known, pipe fittings, for example, copper conduit and fittings, must be thoroughly brushed with wire brushes before they are fitted together for soldering. This is true of both the female and male fittings. These brushing operations require considerable time and labor since at the present time they are performed by hand. Furthermore, because of the laborious nature of these operations, there is a tendency for workmen to do an incomplete or unsatisfactory job. Also, because of the time-consuming nature of the job, there is a possibility of this operation holding up other plumbing operations.

It is, therefore, the main object of our invention to provide a machine which will effectively and thoroughly wire brush pipe fittings in a high speed operation. Another object of our invention is to provide a machine of the type indicated which requires no effort on the part of the operator except the positioning of the fittings on the machine, the holding of the fittings during the brushing operation, and the removal of the fittings and, therefore, makes it possible to use unskilled labor for these brushing operations.

Another object of our invention is to provide a machine of the type indicated which is designed to receive fittings of various sizes.

Still another object of our invention is to provide a machine which is so designed and operates in such a manner that it not only does an effective job but keeps wear of the wire brushes to a minimum.

Various other objects will be apparent.

The preferred embodiment of our invention is illustrated in the accompanying drawings in which like characters of reference designate corresponding parts and in which.

Figure 3:
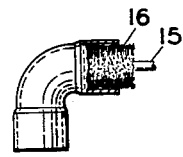
FIGURE 3 is a detail showing the use of one brush in cleaning the inside of a fitting.
Figure 1:
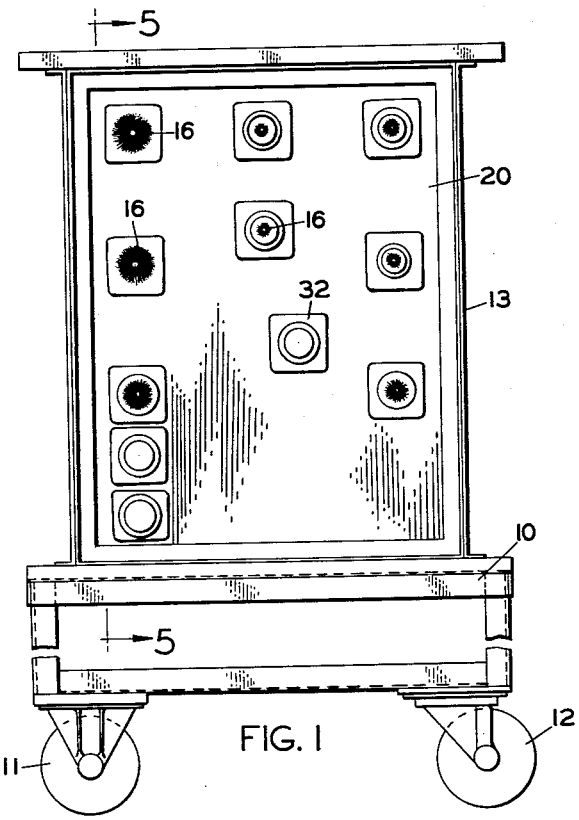
FIGURE 1 is a side elevational view at one side of the machine.
Figure 2:
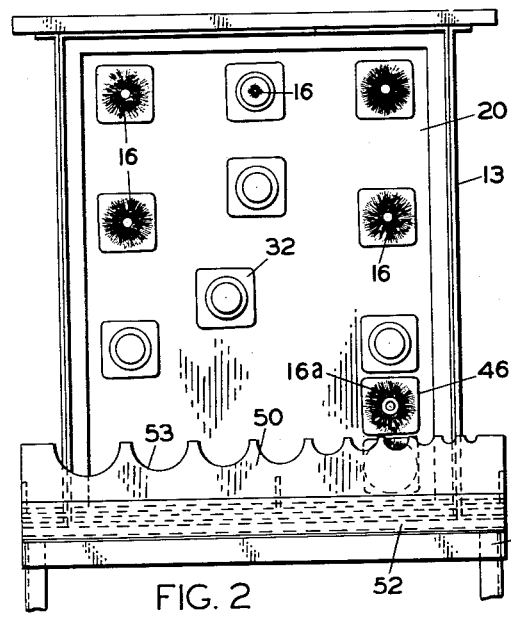
FIGURE 2 is a similar view at the other side of the machine.
Figure 4:
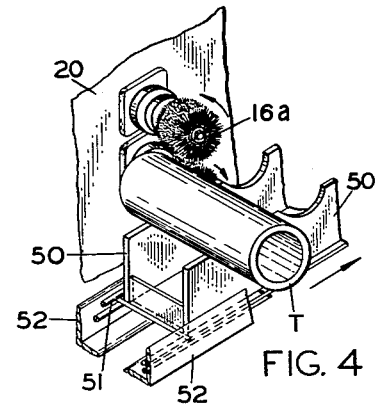
FIGURE 4 is a detail showing the use of the machine in cleaning the outside of a fitting.

With particular reference to the drawings, our machine is shown as being of the portable type carried by a suitable base 10 mounted on wheels comprising a pair of stationary caster wheel units 11 and a pair of swivel caster wheel units 12. However, other portable base structures may be provided or the machine may be of the fixed-base type.

Mounted on the base 10 is an upstanding box-like housing 13. This housing will contain the operating mechanism of the machine. On each side of the housing, a plurality of driven chuck units 14 are provided. Any suitable number of these chuck units may be provided and each is of the collet type for removably receiving the spindle 15 of a wire brush 16. The brushes 16 are of the usual wire-brush type and a number of various sizes are provided for the various chucks 14.

Each chuck 14 is carried on the reduced outer end 17 of a shaft 18. Each shaft 18 is rotatably mounted in the antifriction bearings 19 provided on the opposed side walls 20 of the housing 13. Each chuck 14 is carried on one end only of its shaft 18. Therefore, each shaft may be driven at a selected speed, the selected r.p.m. being suitable for the particular size brush which it carries and, therefore, suitable for cleaning a particular size socket in a fitting. The movement imparted to each shaft 18 by means to be described is not a simple rotation in one direction but is an oscillating or frequently reversing rotation in order that the brush carried thereby will produce a scrubbing action on the fitting and will prevent undue wear on the brush.

Figure 5:
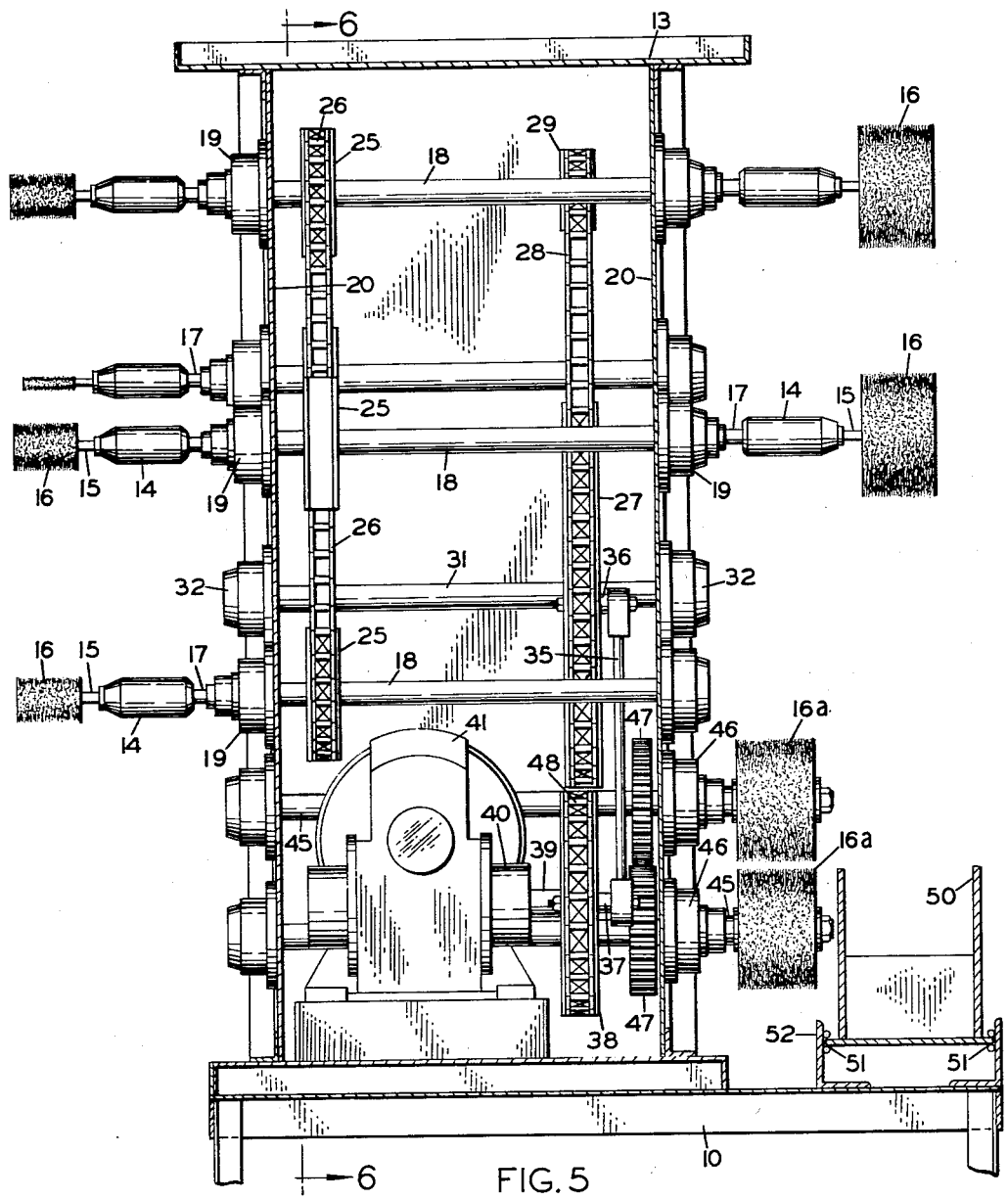
FIGURE 5 is a vertical sectional view through the machine taken substantially along line 5—5 of FIGURE 1.
Figure 6:
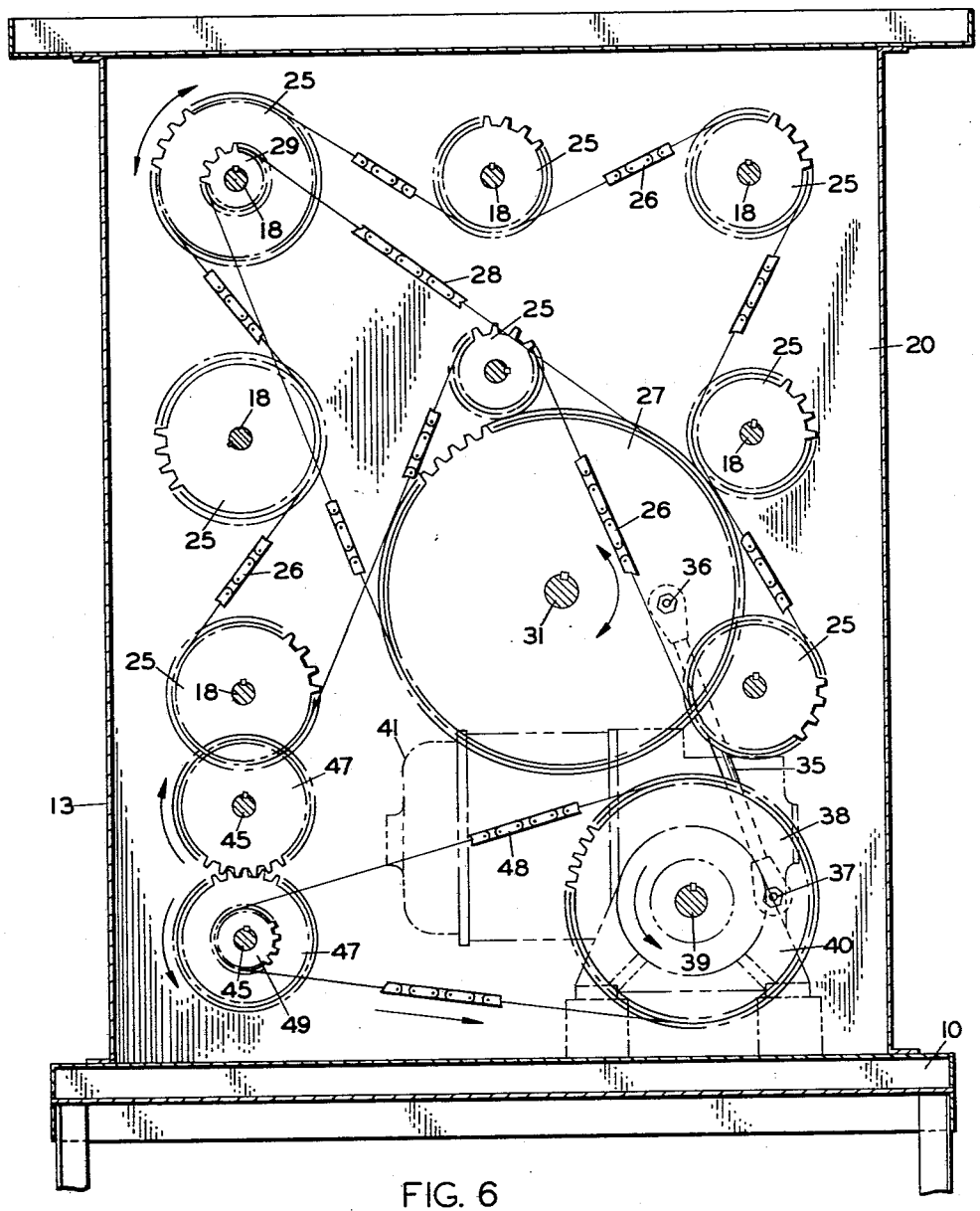
FIGURE 6 is a vertical sectional view taken at right angles to that of FIGURE 5 along line 6—6 of FIGURE 5.

Each shaft 18 is driven by means of a positive chain drive as illustrated in FIGURES 5 and 6. Thus, each shaft 18 carries a sprocket 25 keyed thereto and all of the sprockets 25 are in the same vertical plane (FIGURE 5). The sprockets 25 carried by the various shafts 18 are of different sizes, as illustrated in FIGURE 6, so that each shaft 18 will be driven at a selected speed. A single sprocket chain 26 is passed around all of these sprockets 25 and it will be noted that this chain will drive certain sprockets in one direction while other sprockets are driven in the opposite direction.

As indicated above, the reversal of the direction of rotation of the shafts 18 at frequent intervals is desirable and for this purpose a substantially centrally located oscillatable sprocket 27 is provided. This sprocket 27 drives a sprocket chain 28 which passes therearound and which passes around a driven sprocket 29 keyed on one of the upper shafts 18 (FIGURE 6) and located in the same plane as the sprocket 27. Thus, since all the shafts 18 are connected together by the chain and sprocket drive including the chain 26, all of the shafts 18 will be driven by the sprocket 27. The sprocket 27 is keyed on a transverse shaft 31 which has its outer ends carried in antifriction bearings 32 on the housing side walls 20.

The oscillatable drive sprocket 27 is oscillated by means of a connecting rod 35 which has its upper end pivoted thereto at 36 at a point spaced radially from the axis of the shaft 31. The lower end of this connecting rod 35 is pivoted at 37 to a combination crank and sprocket member 38, the pivot 37 being radially of the axis of rotation of the shaft 39 upon which the member 38 is keyed. The radial distance between the axis of the shaft 39 and that of the pivot pin 37 is less than the radial distance between the axis of the shaft 31 and that of the pivot pin 36. The shaft 39 is driven by a gear-reduction unit 40 which, in turn, is driven by an electric motor 41. It will be apparent that continuous rotation of the crank sprocket 38 in one direction will produce oscillation of the drive sprocket 27, and, therefore, oscillation of all the sprockets 25 and the shafts 18 to which they are keyed. This, in turn, will produce oscillation of the chucks 14 and the brushes 16 carried thereby. Since the sprockets 25 are of various sizes, although all the brushes 16 are rotated simultaneously, they will be driven at different r.p.m.'s.

The various brushes 16 mounted on the chucks 14 are provided for brushing the interior socket portions of various size fittings. In order to brush the external surfaces of fittings, a pair of brushes 16a are provided outside one side wall 20 of the housing. These brushes 16a are driven towards each other and are adapted to receive a tubular pipe or fitting therebetween so as to clean the circumference thereof. The brushes 16a are removably mounted on the outer ends of stub shafts 45 which are rotatably mounted in anti-friction bearings 46 carried on one side wall 20 of the housing 13. Within the wall 20, these shafts 45 have spur gears 47 keyed thereon, these gears meshing with each other. One of the shafts 45 has a drive sprocket 49 keyed thereon and located in the same plane as the sprocket 38 and a chain 48 passes around the sprockets 38 and 49. Thus, rotation of the sprocket 38 will drive the brushes 16a as well as the brushes 16.

For supporting tubes or fittings in association with the brushes 16a, a tube support slide 50 is provided which is movable transversely of the machine towards and away from the brushes 16a. This slide 50 is of channel form and its lower wall projects laterally in both directions to form flanges projecting into guideways 51. The guideways 51 are formed on the inner surfaces of the upright flanges of angle iron members 52. Thus, the slide support 50 is mounted for reciprocable sliding movement between the angle members 52 which are supported by the base 10 of the machine. It will be noted that the upright flanges of the slide 50 are provided with a plurality of pairs of aligning semicircular notches 53 which form cradles that are adapted to receive and support a tube T. Thus, the slide 50 is designed to receive tubes of various diameters. Each cradle formed by a pair of aligning notches 53 will support a tube with its center substantially aligned with the converging throat between the two brushes 16a, regardless of the size of the tube if it is positioned in the proper cradle. A tube supported in this manner can be moved into association with the throat of the brushes 16a for cleaning and can be easily held in that position.

Each of the brushes 16 being oscillated in the manner indicated previously can fit into the interior socket of a fitting, as shown in FIGURE 3, and will effectively scrub the surface clean by its oscillations. The oscillations will be accomplished with a gradual increase and decrease of speed which, in addition to the frequent reversals of direction, will more effectively brush the surface clean. This action will not only produce an effective scrubbing action but will also produce this action without undue wear on the brush. Each different size brush will fit a corresponding size socket in a fitting and, therefore, will more effectively clean the fitting in which it is disposed. The machine can be operated by unskilled labor and the fittings can be quickly and effectively cleaned with such labor.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described our invention, what we claim is:

1. A machine for cleaning pipe fittings or the like comprising a supporting structure, a drive shaft, a series of spindles rotatably mounted on the supporting structure, gearing for transmitting rotary motion from said shaft to each of said spindles, a wire brush mounted on each of said spindles, a driving motor, and means connecting said motor to said shaft for continuously imparting an oscillating movement to said shaft about its axis.

2. A machine for cleaning pipe fittings or the like comprising a supporting structure, a plurality of spindles rotatably mounted on the supporting structure, means for mounting a brush on each of said spindles, and means for driving all of said spindles, said last-mentioned means including means for oscillating each of said spindles about its axis and comprising chain and sprocket drives for connecting all of said shafts together but for rotation at different speeds, a source of power, and a connection between said source of power and said chain and sprocket drives, said connection including means for reversing the motion of the chain and sprocket drives at intervals to oscillate said spindles.

3. A machine according to claim 2 in which said chain and sprocket drive comprises sprockets keyed to all of said spindles and an oscillatable sprocket, all of said sprockets having a single chain engaging therewith, and means for oscillating said oscillatable sprocket, said means comprising a crank driven by said source of power, and a connecting rod between said crank and said oscillatable sprocket.

4. A machine according to claim 3 including a pair of additional spindles having brushes mounted thereon, said spindles being geared together for rotation towards each other, and a chain and sprocket drive between said source of power and said geared spindles.

5. A machine according to claim 1 in which the gearing connecting the drive shaft to certain of said spindles have different transmission ratios for rotating the brush spindles at different speeds.

6. A machine according to claim 5 in which said gearing comprises a sprocket keyed to each of said spindles and to the oscillating shaft, all of said sprockets having a single chain engaging therewith, the shaft oscillating means comprising a crank driven by a source of power, and a connecting rod between said crank and said shaft.

7. A machine for cleaning pipe fittings or the like comprising a supporting structure, a shaft, a plurality of spindles rotatably mounted on the supporting structure, gearing for transmitting rotary motion from said shaft to each of said spindles, a wire brush mounted on each of said spindles, and means for continuously imparting an oscillating movement to said shaft about its axis, said gearing connecting the oscillating shaft to each brush spindle having a transmission ratio such that each of said spindles is turned in each direction more than a complete revolution during each oscillation.

8. A machine for cleaning pipe fittings and the like comprising a supporting structure, a series of spindles rotatably mounted on the supporting structure, a drive shaft, power operated means for imparting turning movements to said shaft, gearing for connecting said shaft to each of said spindles, the gearing connecting said shaft to certain of said spindles having different transmission ratios for turning said spindles at different speeds, and wire brushes of various sizes carried by the spindles that turn at different speeds.

References Cited in the file of this patent

UNITED STATES PATENTS

| | | |
|---|---|---|
| 1,142,716 | Kugel | June 8, 1915 |
| 1,532,717 | Schiller | Apr. 7, 1925 |
| 1,853,078 | Phelps | Apr. 12, 1932 |
| 2,364,704 | Franz | Dec. 12, 1944 |
| 2,376,945 | Stine | May 29, 1945 |
| 2,635,393 | Barth | Apr. 21, 1953 |
| 2,793,473 | Hickman | May 28, 1957 |
| 2,859,627 | Gallop | Nov. 11, 1958 |